(12) United States Patent
Nguyen et al.

(10) Patent No.: US 10,017,689 B2
(45) Date of Patent: Jul. 10, 2018

(54) CRUSH-RESISTANT PROPPANT PARTICULATES FOR USE IN SUBTERRANEAN FORMATION OPERATIONS

(71) Applicant: Halliburton Energy Services, Inc., Houston, TX (US)

(72) Inventors: Philip D. Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/312,899

(22) PCT Filed: Aug. 25, 2014

(86) PCT No.: PCT/US2014/052470
§ 371 (c)(1),
(2) Date: Nov. 21, 2016

(87) PCT Pub. No.: WO2016/032417
PCT Pub. Date: Mar. 3, 2016

(65) Prior Publication Data
US 2017/0183562 A1 Jun. 29, 2017

(51) Int. Cl.
*E21B 43/267* (2006.01)
*C09K 8/80* (2006.01)
*C09K 8/62* (2006.01)

(52) U.S. Cl.
CPC ............ *C09K 8/805* (2013.01); *C09K 8/62* (2013.01); *E21B 43/267* (2013.01); *C09K 2208/08* (2013.01); *C09K 2208/10* (2013.01)

(58) Field of Classification Search
None
See application file for complete search history.

(56) References Cited

U.S. PATENT DOCUMENTS 5,837,656 A 11/1998 Sinclair et al.
7,153,575 B2 12/2006 Anderson et al.
(Continued)

FOREIGN PATENT DOCUMENTS

CA 2198812 A1 8/1998
CA 2921658 A1 3/2015
(Continued)

OTHER PUBLICATIONS

International Search Report and Written Opinion for PCT/US2014/052470 dated May 8, 2015.
(Continued)

*Primary Examiner* — Angela M DiTrani
*Assistant Examiner* — Andrew Sue-Ako
(74) *Attorney, Agent, or Firm* — McDermott Will & Emery LLP

(57) ABSTRACT

Crush-resistant proppant particulates comprising proppant particulates at least partially coated with a polymeric material and inorganic particles, wherein the polymeric material comprises an organic polymeric material, or an inorganic polymeric material, or a combination thereof, wherein the organic polymeric material is selected from the group consisting of an organosilane, an organophosphonate, a polycarboxylic compound, a triazine, a resin comprising a silane coupling agent, and any combination thereof, wherein the inorganic polymeric material is aluminosilicate compound, and wherein the inorganic particle is between about 1 nm to about 10 μm in diameter and selected from the group consisting of alumina, boron carbide, boron nitride, silicate, glass, silicon carbide, silica, quartz, copper oxide, a microfiber, a nanofiber, core-shell, graphene, sodium silicate, sodium metasilicate, and any combination thereof.

9 Claims, 1 Drawing Sheet

(56) References Cited

U.S. PATENT DOCUMENTS

| | | |
|---|---|---|
| 7,350,571 B2 | 4/2008 | Nguyen et al. |
| 7,754,659 B2 | 7/2010 | Rediger et al. |
| 2006/0100342 A1 | 5/2006 | Jensen |
| 2008/0035337 A1* | 2/2008 | Reddy .................. C09K 8/68 166/276 |
| 2009/0238988 A1 | 9/2009 | McDaniel et al. |
| 2010/0065271 A1* | 3/2010 | McCrary ............... C09K 8/805 166/278 |
| 2010/0093566 A1* | 4/2010 | Reyes .................. G01N 15/00 507/271 |
| 2010/0330380 A1 | 12/2010 | Colreavy et al. |
| 2011/0120719 A1* | 5/2011 | Soane .................. C09K 8/94 166/308.1 |
| 2011/0160104 A1 | 6/2011 | Wu et al. |
| 2012/0135894 A1 | 5/2012 | McDaniel et al. |
| 2012/0190597 A1* | 7/2012 | Chatterjee ............. B28B 3/14 507/269 |
| 2012/0227967 A1* | 9/2012 | Shaikh ................ C09K 8/805 166/280.1 |
| 2013/0274153 A1 | 10/2013 | Urbanek |
| 2014/0116704 A1 | 5/2014 | Reddy et al. |

FOREIGN PATENT DOCUMENTS

| | | |
|---|---|---|
| WO | 1992011327 A1 | 7/1992 |
| WO | 2016032417 A1 | 3/2016 |

OTHER PUBLICATIONS

Canadian Office Action from Canadian Patent Application No. 2,955,691, dated Jan. 22, 2018, 4 pages.

* cited by examiner

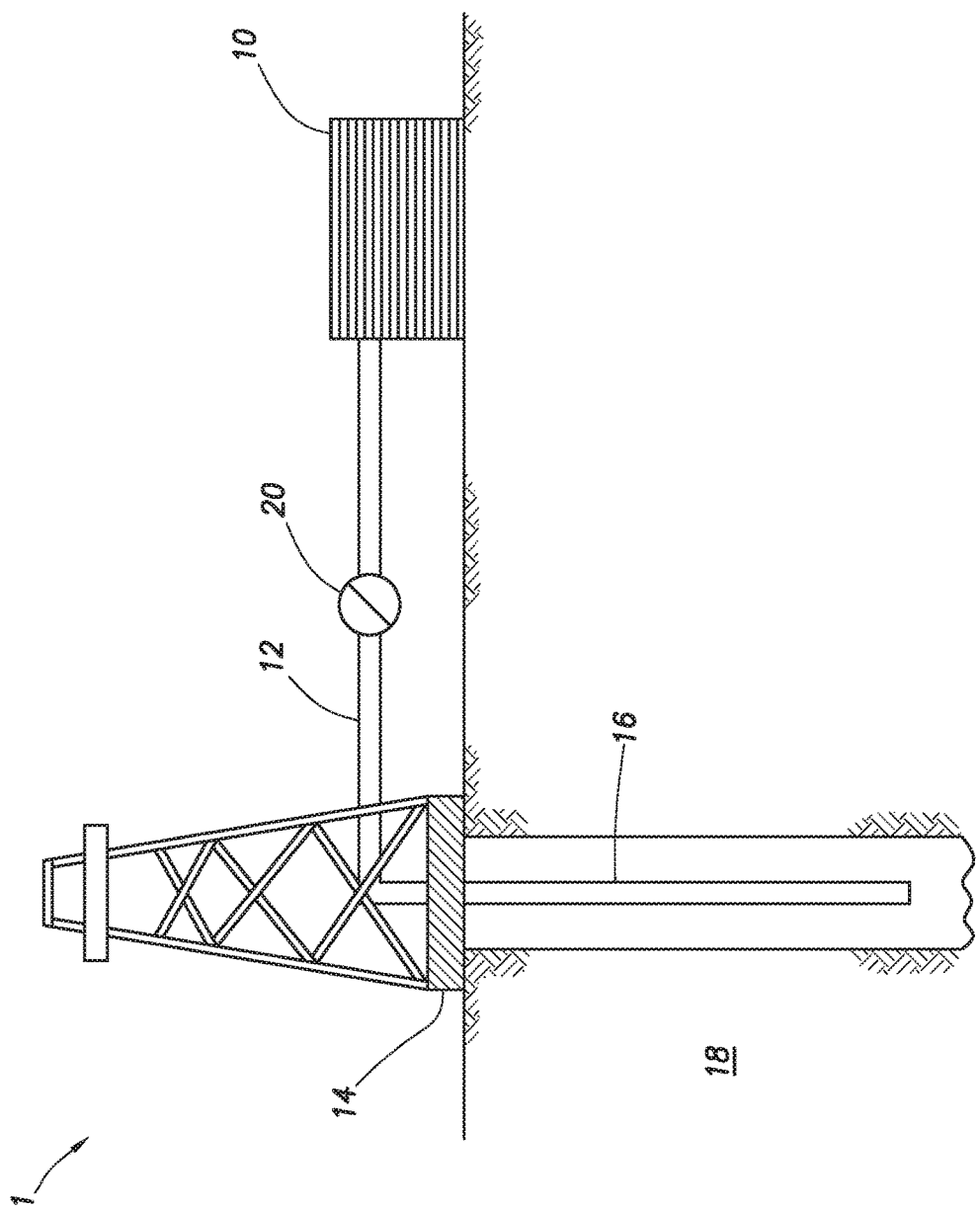

CRUSH-RESISTANT PROPPANT PARTICULATES FOR USE IN SUBTERRANEAN FORMATION OPERATIONS

BACKGROUND

The embodiments herein relate generally to subterranean formation operations and, more particularly, to crush-resistant proppant particulates.

Subterranean wells (e.g., hydrocarbon producing wells, water producing wells, and the like) are often stimulated by hydraulic fracturing treatments. In hydraulic fracturing treatments, a gelled treatment fluid is often pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppant particulates" (also referred to simply as "proppants") serve to prop the fracture open (e.g., keep the fracture from fully closing) after the hydraulic pressure is removed. By keeping the fracture from fully closing, the particulates aid in forming conductive paths through which produced fluids, such as hydrocarbons, may flow.

Hydraulic fracturing treatments may also be combined with sand control treatments, such as a gravel packing treatment. Such treatments may be referred to as "frac-packing" treatments. In a typical frac-packing treatment, a gelled treatment fluid comprising a plurality of particulates is pumped through an annulus between a wellbore tubular mounted with a screen and a wellbore in a subterranean formation. The fluid is pumped into perforations through a casing, or directly into the wellbore in the case of open hole completions at a rate and pressure sufficient to create or enhance at least one fracture, and the proppant particulates are deposited in the fracture and in the annulus between the screen and the wellbore. The proppant particulates aid in propping open the fracture, as well as controlling the migration of formation fines or other loose particles in the formation from being produced with produced fluids.

The proppant particulates placed in a fracture or in the annulus during a frac-packing operation may form a "proppant pack" or "gravel pack" (collectively referred to herein as "proppant pack"). As used herein, the term "proppant pack" refers to a collection of proppant particulates, such as in a fracture in a subterranean formation. The degree of success of a fracturing operation (both a traditional hydraulic fracturing operation and a frac-packing operation) depends, at least in part, upon fracture porosity and conductivity once the fracturing operation is complete and production is begun. The interstitial spaces between individual proppant particulates in a proppant pack permit production fluids to flow therethrough and to be recovered at the surface.

Commonly used proppant particulates generally comprise substantially spherical particles, such as graded sand, bauxite, ceramics, or even nut hulls. When forming a proppant pack, the proppant particulates may become crushed or otherwise compacted within fractures upon removal of hydraulic pressure, thereby potentially forming non-permeable or low permeability masses within the fracture rather than desirable high permeability masses. Such low permeability masses may choke the flow path of the fluids within the formation. Furthermore, the proppant particulates may become embedded in particularly soft formations, negatively impacting production. Because the fracture porosity is closely related to the strength of the placed proppant particulates and the size and shape of the placed proppant, the presence of crushed or a mixture of crushed and non-crushed proppant particulates in a fracture may greatly reduce the permeability of the fracture and thus hydrocarbon production.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids comprising the crush-resistant proppant particulates of the embodiments described herein to a downhole location.

DETAILED DESCRIPTION

The embodiments herein relate generally to subterranean formation operations and, more particularly, to crush-resistant proppant particulates. Specifically, the crush-resistant proppant particulates of the present disclosure comprise proppant particulates at least partially coated with a polymeric material having inorganic particles either within the polymeric material or positioned such that they assemble as a coating on the surface of the polymeric material. Polymeric material suitable for use in the present invention may be either organic or inorganic. The crush-resistant proppant particulates described herein may withstand fracture closure pressures (and other equivalent pressures) of between a lower limit of about 6,000, 6,500, 7,000, 7,500, 8,000, 8,500, 9,000, 9,500, 10,000, 10,500, and 11,000 to an upper limit of about 16,000, 15,500, 15,000, 14,500, 14,000, 13,500, 13,000, 12,500, 12,000, 11,500, and 11,000 psi, encompassing any value and subset therebetween.

Several advantages of the crush-resistant proppant particulates of the present disclosure include, but are not limited to, stability and maintenance of crush-resistant properties even in high temperatures where traditional polymeric coating (lacking the inorganic particles described herein) would become unstable. The crush-resistance proppant particulates of the present disclosure are additionally reactively incompatible (i.e., inert) with the treatment fluids and other additives described herein that may be used in combination with the crush-resistant proppant particulates.

In some embodiments, the methods and compositions described herein may be with reference to a hydraulic fracturing operation (e.g., formation of a proppant pack). However, the crush-resistant proppant particulates may be used in any other subterranean formation operation that may benefit their crush resistant properties. Such subterranean formation operations may include, but are not limited to, a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides crush-resistant proppant particulates comprising proppant particulates at least partially coated with a polymeric material (that may be organic, inorganic, or a combination thereof) and inorganic particles. The proppant particulates may be wholly or substantially (wherein "substantially" refers to "largely but not necessarily wholly") coated with a polymeric material and inorganic particles or may be only partly coated therewith. In some embodiments, the crush-resistant proppant particulates may be included in a treatment fluid and introduced into a subterranean formation having at least one fracture therein. The crush-resistant proppant particulates may be placed into the facture to form a proppant pack. In some embodiments, treatment fluid comprising the crush-resistant proppant particulates itself may be used to form the fracture in the formation by introducing the treatment fluid therein at a rate and pressure sufficient to create or enhance the fracture. In other embodiments, a separate fluid or other means (e.g., hydrojet) may be used to form the fracture prior to introducing the treatment fluid comprising the crush-resistant proppant particulates.

The crush-resistant proppant particulates disclosed herein comprise an inorganic particle either within polymeric material or positioned such that they assemble as a coating on the surface of the polymeric material, the polymeric material itself being at least partially coated onto proppant particulates. The inorganic particle may be composed of a material including oxides, carbides, borides, nitrides of metals or semimetals, and any combination thereof. Specific examples of suitable inorganic particles for use in forming the crush-resistant proppant particulates described herein may include, but not be limited to, alumina, boron carbide, boron nitride, silicate, glass, silicon carbide, silica, quartz, copper oxide, a microfiber, a nanofiber, core-shell, graphene, sodium silicate, sodium metasilicate, and any combination thereof. Generally, the inorganic particles may be of any shape, but may be preferably substantially (i.e., largely but not necessarily wholly) spherical in shape. Suitable non-spherical shapes that the inorganic particles of the present disclosure may adopt include, but are not limited to, cubic-shaped, rectangular-shaped, rod-shaped, ellipse-shaped, cone-shaped, pyramid-shaped, cylinder-shaped, and any combination thereof. That is, in embodiments wherein the inorganic particles are substantially non-spherical, the aspect ratio of the material may range such that the material is fibrous to such that it is cubic, octagonal, or any other configuration.

Regardless of the shape of the inorganic particles forming a portion of the crush-resistant proppant particulates of the present disclosure, the diameter thereof may be in the range of between a lower limit of about 1 nm, 250 nm, 500 nm, 750 nm, 1 µm, 1.25 µm, 1.5 µm, 1.75 µm, 2 µm, 2.25 µm, 2.5 µm, 2.75 µm, 3 µm, 3.25 µm, 3.5 µm, 3.75 µm, 4 µm, 4.25 µm, 4.5 µm, 4.75 µm, and 5 µm to an upper limit of about 10 µm, 9.75 µm, 9.5 µm, 9.25 µm, 9 µm, 8.75 µm, 8.5 µm, 8.25 µm, 8 µm, 7.75 µm, 7.5 µm, 7.25 µm, 7 µm, 6.75 µm, 6.5 µm, 6.25 µm, 6 µm, 5.75 µm, 5.5 µm, 5.25 µm, and 5 µm, encompassing any value and subset therebetween. As discussed in more detail below, the inorganic particles are smaller in size than the proppant particulates onto which they are coated, such that, in some embodiments, a plurality of the inorganic particles, in combination with the organic or inorganic polymeric material to impart crush-resistance to the proppant particulates.

In the embodiments described herein, the proppant particulates are at least partially coated with the inorganic particles and a polymeric material that may be organic or inorganic. The order of coating is not limited in the present disclosure and any order of coating may be employed without departing from the scope of the present disclosure. For example, the polymeric material may first be coated onto the proppant particulates followed by deposition of the inorganic particles thereon, such that the proppant particulates exhibit a first layer of the polymeric material followed by a second layer of the inorganic particles, which may be dispersed or tightly packed. Such a layered configuration may be achieved simply by coating first the polymeric material and then applying the inorganic particles on top of the polymeric material. In other embodiments, the layered configuration may be achieved by a three-step process of activation, self-assembly, and deposition. Activation may be achieved by contacting the proppant particulates to be at least partially coated with an oxidizing agent to prepare the surface of the proppant particulate to accept the inorganic or organic polymeric material (e.g., such as by exposing hydroxyl functional groups for binding). The inorganic and organic polymeric material then binds onto the proppant particulate in a layered formation and the inorganic particles bind thereto in a layer above the organic or inorganic polymeric material. The inorganic particles may also intermix with the inorganic and organic polymeric materials then bind onto the proppant particulate in layers. Suitable oxidizing agents for use in activating the proppant particulates may include, but are not limited to, hydrogen peroxide, sodium perborate, an alkali metal peroxide, sodium peroxyborate tetrahydrate, sodium peroxyborate mono-hydrate, potassium dichromate, sodium carbonate peroxydihydrate, sodium peroxydiphosphate, potassium peroxydiphosphate, potassium carbonate peroxydihydrate, and any combination thereof.

In yet other embodiments, the organic and inorganic polymeric material and the inorganic particles may be co-coated on the proppant particulates together to form a network wherein the inorganic particles are dispersed within the organic or inorganic polymeric material coated onto the proppant particulates at least partially to form the crush-resistant proppant particulates. In some embodiments, for example, the organic or inorganic polymeric material and the inorganic particles can be pre-mixed (e.g., for ease of storage) and either coated onto the proppant particulates prior to performing a subterranean formation operation (e.g., stored offsite or onsite) or on-the-fly as the proppant particulates and the inorganic or organic polymeric material and inorganic particles material are introduced into the subterranean formation. As used herein, the term "on-the-fly" refers to performing an operation during a subterranean treatment that does not require stopping normal operations.

In some embodiments, the organic polymeric material may include, but is not limited to, an organosilane, an organophosphonate, a polycarboxylic compound, a triazine, a resin comprising a silane coupling agent, and any combination thereof. Suitable organosilanes may include, but are not limited to, tetraethyl orthosilicate, gamma-methacryloxypropyltrimethoxysilane, 1,2-bis-(triethoxysilyl) ethane, hexadecyltrimethoxysilane, 3-glycidoxypropyltrimethoxysilane,-dichloro(diphenyl)silane, dichlorodimethylsilane, and any combination thereof. Suitable organophosphonates may include, but are not limited to, methylphosphonic acid, hydroxyethylidine diphosphoric acid, any salt thereof, and combinations thereof.

The resin comprising the silane coupling agent suitable for use in as the organic polymeric material forming the crush-resistant proppant particulates may be any resin capable of having a silane coupling agent incorporated therewith. Suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof. The silane coupling agent may, among other things, act as a mediator to help bond the organic polymeric resin to the proppant particulates described herein. Suitable silane coupling agents may include, but are not limited to, N-2-(aminoethyl)-3-aminopropyl trimethoxysilane, 3-glycidoxypropyltrimethoxysilane, and N-beta-(aminoethyl)-gamma-aminopropyl trimethoxysilane, and any combination thereof. In some embodiments, the silane coupling agent comprises from a lower limit of about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the resin component, encompassing any value and subset therebetween.

In some embodiments, the organic polymeric material is a compound having at least one of a triazine heterocycle group, a free amino group ($-NH_2$), a diamino-polyethylene glycol group, and any combination thereof. Suitable triazine heterocycle groups may include, but are not limited to one or more of a triazine isomer or derivative thereof including 1,2,3-triazine, 1,2,4-triazine, 1,3,5-triazine, and any combination thereof.

In some embodiments, the organic polymeric material may further be functionalized with a functional group, which may facilitate coating (i.e., chemical bonding and/or surface adherence by other mechanisms) of the organic polymeric material onto the proppant particulate surface. The functionalization may additionally aid in bonding the inorganic particles to the polymeric coating, whether assembled in multiple layers or interspersed in a network within the organic polymeric material at least partially coated onto the proppant particulates. Suitable functional groups for use in functionalizing the organic polymeric materials described herein may include, but are not limited to, a Si—O—R group where R is an organic compound, a Si—Cl group, a silanol (Si—O—H) group, a carboxyl (COOH) group, an amine ($NH_2$) group, a phosphate group, a phosphonate group, a sulfonate group, a sulfate group, an aldehyde group, a ketone group, any compound comprising one of the foregoing groups, and any combination thereof. Generally, the functional groups (of any type or combination) may be chemically bound to the organic polymeric material in any amount ranging from a single functional group to saturation, wherein the organic polymeric material is no longer able to accept a functional group for covalent bonding thereon.

The inorganic polymeric material suitable for forming the crush-resistant proppant particulates described herein may include, but is not limited to, an aluminosilicate. Suitable aluminosilicates may include, but are not limited to, halloysite, imogolite, cylindrite, boulangerite, heulandite, stilbite, epistilbite, clinoptilolite, andalusite, kyanite, sillmanite, sanidine, orthoclase, albite, anorthite, zeolite, jaujasite, and any combination thereof.

The proppant particulates forming the crush-resistant proppant particulates of the present disclosure may be formed of any material capable of withstanding fracture closure pressures in a subterranean formation or pressures of subterranean formation operations forming a gravel pack. In some embodiments, the proppant particulates may be a natural or man-made material such as, for example, silica, alumina, fumed carbon, carbon black, graphite, mica, titanium dioxide, meta-silicate, calcium silicate, kaolin, talc, zirconia, boron, fly ash, and any combination thereof. The proppant particulates may additionally be of any size and shape combination suitable for the particular subterranean formation operation in which they are being used (e.g., a fracturing operation) and larger than the inorganic particles which are coated thereon as part of forming the crush-resistant proppant particulates described herein. Generally, where the chosen proppant particulate is substantially spherical, suitable proppant particulates may have a size in the range of from a lower limit of about 2 mesh, 10 mesh, 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, and 200 mesh to an upper limit of about 400 mesh, 390 mesh, 380 mesh, 370 mesh, 360 mesh, 350 mesh, 340 mesh, 330 mesh, 320 mesh, 310 mesh, 300 mesh, 290 mesh, 280 mesh, 270 mesh, 260 mesh, 250 mesh, 240 mesh, 230 mesh, 220 mesh, 210 mesh, and 200 mesh, U.S. Sieve Series, encompassing any value and subset therebetween. In some embodiments of the present disclosure, the proppant particulates may have a size in the range of from about 8 to about 120 mesh, U.S. Sieve Series.

In some embodiments of the present disclosure, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in length, encompassing any value and subset therebetween. In other embodiments, the longest axis is from about 0.05 inches to about 0.2 inches in length. In one embodiment, the substantially non-spherical proppant particulates may be cylindrical and have an aspect ratio of about 1.5 to about 1, and about 0.08 inches in diameter and about 0.12 inches in length. In another embodiment, the substantially non-spherical proppant particulates may be cubic having sides of about 0.08 inches in length. The use of substantially non-spherical proppant particulates may be desirable in some embodiments because, among other things, they may provide a lower rate of settling when slurried into a treatment fluid, or may be better suited for placement in the preexisting and/or new fractures in a subterranean formation to form a proppant pack.

In general, the treatment fluid used to deliver the crush-resistant proppant particulates may include a base fluid, not limited to one of oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

In some embodiments, the treatment fluid comprising the crush-resistant proppant particulates described herein may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids comprising the crush-resistant proppant particulates described herein to a downhole location are described. In various embodiments, the systems may comprise a pump fluidly coupled to a tubular, the tubular containing the treatment fluids described herein. It will be appreciated that while the system described below may be used for delivering treatment fluids described herein, one or more portions of the treatment fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: preparing a treatment fluid comprising crush-resistant proppant particulates comprising proppant particulates at least partially coated with a polymeric material and inorganic particles, wherein the polymeric material comprises an organic material, an inorganic material, or a combination thereof, wherein the organic polymeric material may be selected from the group consisting of an organosilane, an organophosphonate, a polycarboxylic compound, a triazine heterocycle, a resin comprising a silane coupling agent, and any combination thereof, wherein the inorganic polymeric material is an aluminosilicate compound, and wherein the inorganic particle is between about 1 nm to about 10 µm in diameter and selected from the group consisting of alumina, boron carbide, boron nitride, silicate, glass, silicon carbide, silica, quartz, copper oxide, a microfiber, a nanofiber, core-shell, graphene, sodium silicate, sodium metasilicate, and any combination thereof; introducing the treatment fluid into a subterranean formation having at least one fracture; and placing the crush-resistant proppant particulates into the at least one fracture to form a proppant pack.

Embodiment B: Crush-resistant proppant particulates comprising: proppant particulates at least partially coated with a polymeric material and inorganic particles, wherein the polymeric material comprises an organic polymeric material, or an inorganic polymeric material, or a combination thereof, wherein the organic polymeric material is selected from the group consisting of an organosilane, an organophosphonate, a polycarboxylic compound, a triazine, a resin comprising a silane coupling agent, and any combination thereof, wherein the inorganic polymeric material is an aluminosilicate compound, and wherein the inorganic particle is between about 1 nm to about 10 µm in diameter and selected from the group consisting of alumina, boron carbide, boron nitride, silicate, glass, silicon carbide, silica, quartz, copper oxide, a microfiber, a nanofiber, core-shell, graphene, sodium silicate, sodium metasilicate, and any combination thereof.

Embodiment C: A system comprising: a wellhead with a tubular extending therefrom and into a subterranean formation, and a pump fluidly coupled to the tubular, the tubular comprising a treatment fluid comprising crush-resistant proppant particulates comprising proppant particulates at least partially coated with a polymeric material and inorganic particles, wherein the polymeric material comprises an organic polymeric material, an inorganic material, or a combination thereof; wherein the organic polymeric material is selected from the group consisting of an organosilane, an organophosphonate, a polycarboxylic compound, a triazine, a resin comprising a silane coupling agent, and any combination thereof, wherein the inorganic polymeric material is an aluminosilicate compound, and wherein the inorganic particle is between about 1 nm to about 10 µm in diameter and selected from the group consisting of alumina, boron carbide, boron nitride, silicate, glass, silicon carbide, silica, quartz, copper oxide, a microfiber, a nanofiber, core-shell, graphene, sodium silicate, sodium metasilicate, and any combination thereof.

Each of embodiments A, B, and C may have one or more of the following additional elements in any combination:

Element 1: Wherein the crush-resistant proppant particulates withstand closure pressures of between about 6,000 psi and 16,000 psi.

Element 2: Wherein at least a portion of the organic polymeric material is functionalized with a functional group selected from the group consisting of a Si—O—R group where R is an organic compound, a Si—Cl group, a silanol (Si—O—H) group, a carboxyl (COOH) group, an amine ($NH_2$) group, a phosphate group, a phosphonate group, a sulfonate group, a sulfate group, an aldehyde group, a ketone group, any compound comprising one of the foregoing groups, and any combination thereof.

Element 3: Wherein the organic polymeric material is an organosilane selected from the group consisting of tetraethyl orthosilicate, gamma-methacryloxypropyltrimethoxysilane, 1,2-bis-(triethoxysilyl) ethane, hexadecyltrimethoxysilane, 3-glycidoxypropyltrimethoxysilane, dichloro(diphenyl)silane, dichlorodimethylsilane, and any combination thereof.

Element 4: Wherein the organic polymeric material is a compound having at least one of a triazine heterocycle group, a triazine group, a free amino group, and a diamino-polyethylene glycol group.

Element 5: Wherein the crush-resistant proppant particulate coating is configured such that there is a first layer of the organic polymeric material or inorganic polymeric material followed by a second layer of the inorganic particles.

Element 6: Wherein the crush-resistant proppant particulate coating is configured such that the inorganic particles are dispersed within a network of the organic polymeric material or the inorganic polymeric material.

Element 7: Wherein crush-resistant proppant particulates are formed with the organic polymeric material and the inorganic particles, and prior to coating, the proppant particulates are exposed to an oxidizing agent.

Element 9: Wherein the proppant particulates are composed of a material selected from the group consisting of silica, alumina, fumed carbon, carbon black, graphite, mica, titanium dioxide, meta-silicate, calcium silicate, kaolin, talc, zirconia, boron, fly ash, and any combination thereof.

By way of non-limiting example, exemplary combinations applicable to A, B, and C include: A with 1 and 2; A with 2, 3, and 5; A with 7 and 8; A with 4, 6, and 8; B with 2, 4, and 5; B with 6 and 8; B with 4 and 6; C with 3, 5, and 8; C with 2 and 7; C with 4 and 6; C with 1, 2, and 5.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a treatment fluid comprising proppant particulates at least partially coated with a polymeric material and inorganic particles,
wherein the polymeric material comprises an organic polymeric material, wherein the organic polymeric material comprises an organosilane selected from the group consisting of tetraethyl orthosilicate, gamma-methacryloxypropyltrimethoxysilane, 1,2-bis-(triethoxysilyl) ethane, hexadecyltrimethoxysilane, 3-glycidoxypropyltrimethoxysilane, dichloro(diphenyl)silane, dichlorodimethylsilane, and any combination thereof, and
wherein the inorganic particles are between about 1 nm to about 10 μm in diameter and selected from the group consisting of alumina, boron carbide, boron nitride, silicate, glass, silicon carbide, silica, quartz, copper oxide, a microfiber, a nanofiber, graphene, sodium silicate, sodium metasilicate, and any combination thereof;
introducing the treatment fluid into a subterranean formation having at least one fracture,
wherein the polymeric material and the inorganic particles are at least partially coated onto the proppant particulates on-the-fly as the proppant particulates, the polymeric material, the inorganic particles, and the treatment fluid are individually introduced into the subterranean formation; and
placing coated proppant particulates into the at least one fracture to form a proppant pack,
wherein the coated proppant particulates withstand closure pressures of between about 6,000 psi and 16,000 psi.

2. The method of claim 1, wherein the treatment fluid includes an oil-based fluid, aqueous-based fluid, aqueous-miscible fluid, water-in-oil emulsion, or an oil-in-water emulsion.

3. The method of claim 1, wherein at least a portion of the organic polymeric material is functionalized with a functional group selected from the group consisting of a Si—O—R group where R is an organic compound, a Si—Cl group, a silanol (Si—O—H) group, a carboxyl (COOH) group, an amine ($NH_2$) group, a phosphate group, a phosphonate group, a sulfonate group, a sulfate group, an aldehyde group, a ketone group, any compound comprising one of the foregoing groups, and any combination thereof.

4. The method of claim 1, wherein the proppant particulate coating is configured such that there is a first layer of the organic polymeric material followed by a second layer of the inorganic particles.

5. The method of claim 1, wherein the proppant particulate coating is configured such that the inorganic particles are dispersed within a network of the organic polymeric material.

6. The method of claim 1, wherein prior to coating the proppant particulates, the proppant particulates are exposed to an oxidizing agent.

7. The method of claim 1, wherein the proppant particulates are composed of a material selected from the group consisting of silica, alumina, fumed carbon, carbon black, graphite, mica, titanium dioxide, meta-silicate, calcium silicate, kaolin, talc, zirconia, boron, fly ash, and any combination thereof.

8. A system comprising:
a wellhead with a tubular extending therefrom and into a subterranean formation; and
a pump fluidly coupled to the tubular, the tubular comprising a treatment fluid comprising proppant particulates at least partially coated with a polymeric material and inorganic particles, wherein the polymeric material and the inorganic particles are at least partially coated onto the proppant particulates on-the-fly as the proppant particulates, the polymeric material, the inorganic particles, and the treatment fluid are individually introduced into the subterranean formation, wherein the coated proppant particulates withstand closure pressures of between about 6,000 psi and 16,000 psi, wherein the polymeric material comprises an organic polymeric material, wherein the organic polymeric material comprises an organosilane selected from the group consisting of tetraethyl orthosilicate, gamma-methacryloxypropyltrimethoxysilane, 1,2-bis-(triethoxysilyl) ethane, hexadecyltrimethoxysilane, 3-glycidoxypropyltrimethoxysilane, dichloro(diphenyl)silane, dichlorodimethylsilane, and any combination thereof, and wherein the inorganic particles are between about 1 nm and about 10 μm in diameter and selected from the group consisting of alumina, boron carbide, boron nitride, silicate, glass, silicon carbide, silica, quartz, copper oxide, a microfiber, a nanofiber, graphene, sodium silicate, sodium metasilicate, and any combination thereof.

9. The system of claim 8, wherein the treatment fluid includes an oil-based fluid, aqueous-based fluid, aqueous-miscible fluid, water-in-oil emulsion, or an oil-in-water emulsion.

* * * * *